US011477125B2

(12) United States Patent
Browne et al.

(10) Patent No.: US 11,477,125 B2
(45) Date of Patent: Oct. 18, 2022

(54) OVERLOAD PROTECTION ENGINE

(71) Applicant: Intel Corporation, Santa Clara, CA (US)

(72) Inventors: John J. Browne, Limerick (IE); Chris MacNamara, County Limerick (IE); Ronen Chayat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 15/594,838

(22) Filed: May 15, 2017

(65) Prior Publication Data

US 2018/0331960 A1    Nov. 15, 2018

(51) Int. Cl.
| | |
|---|---|
| H04L 47/2441 | (2022.01) |
| H04L 49/505 | (2022.01) |
| H04L 9/40 | (2022.01) |
| H04L 47/11 | (2022.01) |
| H04L 47/2425 | (2022.01) |
| H04L 47/32 | (2022.01) |
| H04L 67/10 | (2022.01) |

(52) U.S. Cl.
CPC ........ *H04L 47/2441* (2013.01); *H04L 49/508* (2013.01); *H04L 63/0209* (2013.01); *H04L 47/11* (2013.01); *H04L 47/2433* (2013.01); *H04L 47/32* (2013.01); *H04L 63/0236* (2013.01); *H04L 63/145* (2013.01); *H04L 63/1408* (2013.01); *H04L 67/10* (2013.01)

(58) Field of Classification Search
CPC .............. H04L 47/2441; H04L 49/508; H04L 63/0209; H04L 47/11; H04L 47/2433; H04L 47/32; H04L 63/0236; H04L 63/1408; H04L 63/145; H04L 67/10
See application file for complete search history.

(56) References Cited

U.S. PATENT DOCUMENTS

| | | | |
|---|---|---|---|
| 6,950,886 B1 * | 9/2005 | Bailey | G06F 15/17 370/389 |
| 7,586,918 B2 * | 9/2009 | Levy | H04L 45/302 370/395.1 |
| 2004/0264500 A1 * | 12/2004 | Bansal | H04L 47/24 370/468 |
| 2009/0161547 A1 * | 6/2009 | Riddle | G06F 9/526 370/395.7 |
| 2009/0163223 A1 * | 6/2009 | Casey | H04W 36/22 455/453 |
| 2010/0106874 A1 * | 4/2010 | Dominguez | G06F 13/385 710/260 |
| 2011/0176554 A1 * | 7/2011 | Yamada | H04L 47/29 370/412 |
| 2014/0341109 A1 * | 11/2014 | Cartmell | H04L 43/50 370/328 |

(Continued)

*Primary Examiner* — Walter J Divito
*Assistant Examiner* — Anthony Luo
(74) *Attorney, Agent, or Firm* — Patent Capital Group

(57) ABSTRACT

A fabric interface, including: an ingress port to receive incoming network traffic; a host interface to forward the incoming network traffic to a host; and a virtualization-aware overload protection engine including: an overload detector to detect an overload condition on the incoming network traffic; a packet inspector to inspect packets of the incoming network traffic; and a prioritizer to identify low priority packets to be dropped, and high priority packets to be forwarded to the host.

29 Claims, 11 Drawing Sheets

(56) References Cited

U.S. PATENT DOCUMENTS

| | | | |
|---|---|---|---|
| 2016/0182380 A1* | 6/2016 | Mehra | H04L 45/7453 |
| | | | 709/226 |
| 2016/0359682 A1* | 12/2016 | Senarath | H04W 16/14 |
| 2016/0381585 A1* | 12/2016 | Dudzinski | H01Q 3/12 |
| | | | 370/252 |
| 2018/0123950 A1* | 5/2018 | Garg | H04L 47/18 |
| 2018/0316521 A1* | 11/2018 | Liebsch | H04L 45/586 |
| 2019/0254037 A1* | 8/2019 | Gupta | H04W 72/042 |

* cited by examiner

OVERLOAD PROTECTION ENGINE

FIELD OF THE SPECIFICATION

This disclosure relates in general to the field of data centers, and more particularly, though not exclusively to, a system and method for overload protection in a virtual network function (VNF).

BACKGROUND

Contemporary computing practice has moved away from hardware-specific computing and toward "the network is the device." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
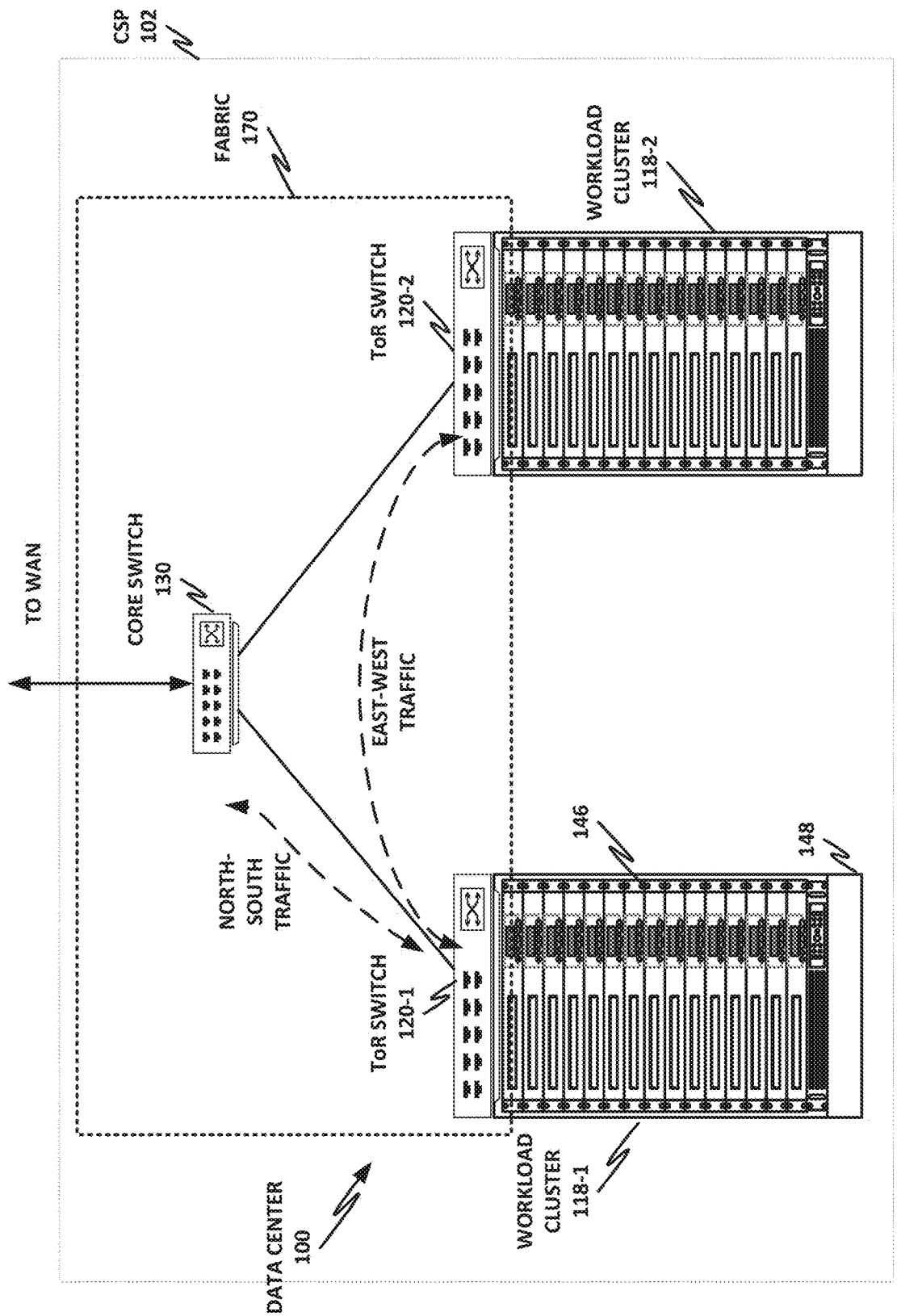
FIG. 1 is a network-level diagram of a network of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

One challenge in network function virtualization is that virtual network functions (VNFs) performing high-speed data plane and signaling processing can sometimes be flooded with traffic, which causes the VNF to be overloaded and causes the virtualized application to become congested and unresponsive. This can be a particular issue in the data center because VNFs often perform infrastructure type operations so that if a VNF becomes unresponsive, it may become a bottleneck to other parts of the data center.

Examples of flooding may include signaling storms generated in the network, wherein the high compute loads required to handle the storm can cause the processor to be overloaded.

To address this issue, the embodiments of the present specification provide a system and method for handling VNF overload with a virtualization aware overload protection engine (OPE) that can, in some examples, detect and mitigate an overload condition before it reaches the processor. This is in contrast to embodiments wherein a flood of network packets are forwarded to the processor, and then the core has to examine the packets and determine which ones should be kept and which ones should be dropped. Because this process itself utilizes core resources, even the activity of inspecting and dropping some packets can overload the core. Thus, when a CPU receive queue becomes full and the CPU begins discarding packets or disabling input ports of I/O devices to prevent more traffic from arriving, it may already be too late to prevent this core from becoming bogged down. Furthermore, the use of ACL policies in the core or in the fabric interface or in software may assume the availability of processor resources during severe overload conditions. However, as illustrated before, the CPU itself may become bogged down by the packet flood, and may not be available. Furthermore, the wholesale shutdown of queues and ports may result in the loss of high priority or critical packets such as failover protocol traffic, routing table updates, and heartbeats by way of nonlimiting example. This may be caused by the timing window between when the overload is detected and when the policy is applied.

Thus, it is advantageous to detect a packet flood before it reaches the CPU, to prioritize the incoming packets to ensure that high priority packets can be identified, and to provide high priority packets to the core while ignoring low priority packets.

This can be accomplished by an overload protection engine located in hardware, for example, on a gateway device such as a network interface or a fabric interface. A fabric interface is used throughout this specification as an example, but it should be understood to represent any suitable interface to a communication bus or network, including an Ethernet network, a high-speed fabric such as Intel OmniPath, or any other suitable communication medium.

In certain embodiments, an overload protection engine may include a hysteresis function that detects the presence of an existing or imminent overload condition, wherein the hysteresis provides smoothing to avoid jitter, and selectively either enables or disables the overload protection engine for incoming traffic.

When the overload protection engine is enabled, then incoming packets are inspected and assigned a priority. During the enablement of the OPE, only high priority packets are forwarded to the host cores or processors. Other packets, which are designated as low priority packets, may be discarded. It should be noted that in this specification, packets are referred to as "high priority" and low priority" to illustrate classes of packets that are to be forwarded to the core even during potential overload conditions, versus packets that may be ignored during such conditions. The designation of high priority and low priority areas is not intended to otherwise refer to the importance of the packet. It should be understood that in various applications, in designing and operating an overload protection engine, the determination of which packets should be designated as high priority versus low priority is an exercise of ordinary skill that depends on the specific needs of the implementation.

In certain embodiments, the OPE may include a multi-tiered decision process; in the first place, there may be a packet dispatcher that identifies high-priority packets that are always to be forwarded to the host. Any packets that pass through the packet dispatcher may then enter a decision tree, which may include a multistage packet inspection mechanism, that can inspect packets for properties such as VNF priority, virtual interface priority, protocol priority, and traffic classes. At each of these stages, some traffic may be determined to be high-priority and forwarded to the core, while other traffic may be determined to be low priority and discarded. There may also be some traffic that passes through each node of the decision tree and is not found definitively to be either high priority or low priority, in which case the packet may be passed on to the next element in the decision tree, until the packet reaches the final stage of the decision tree, where it is either designated as high priority and forwarded to the host, or is discarded.

Certain embodiments of the present specification also may provide additional processing, such as providing load-balancing services to determine, if a packet is to be forwarded to the core, which core in a multicore architecture is to receive it. A post-processing element may also apply weighted random early detection (W read) to mark packets for further inspection by the core. Thus, even when a packet is ultimately forwarded to the core, the W read marking may designate the packet as, for example, "green, yellow, or red" so that the core itself can determine whether the packet is really needed. Advantageously, the core, which provides software services, may be capable of implementing even more detailed algorithms for analyzing packets. Thus, even in the class of packets that pass through the OPE, the core may further make decisions about which packets to process normally, and which packets to discard at the core. A system and method for overload protection in a VNF will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® OmniPath™, TrueScale™, Ultra Path Interconnect (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as OmniPath™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
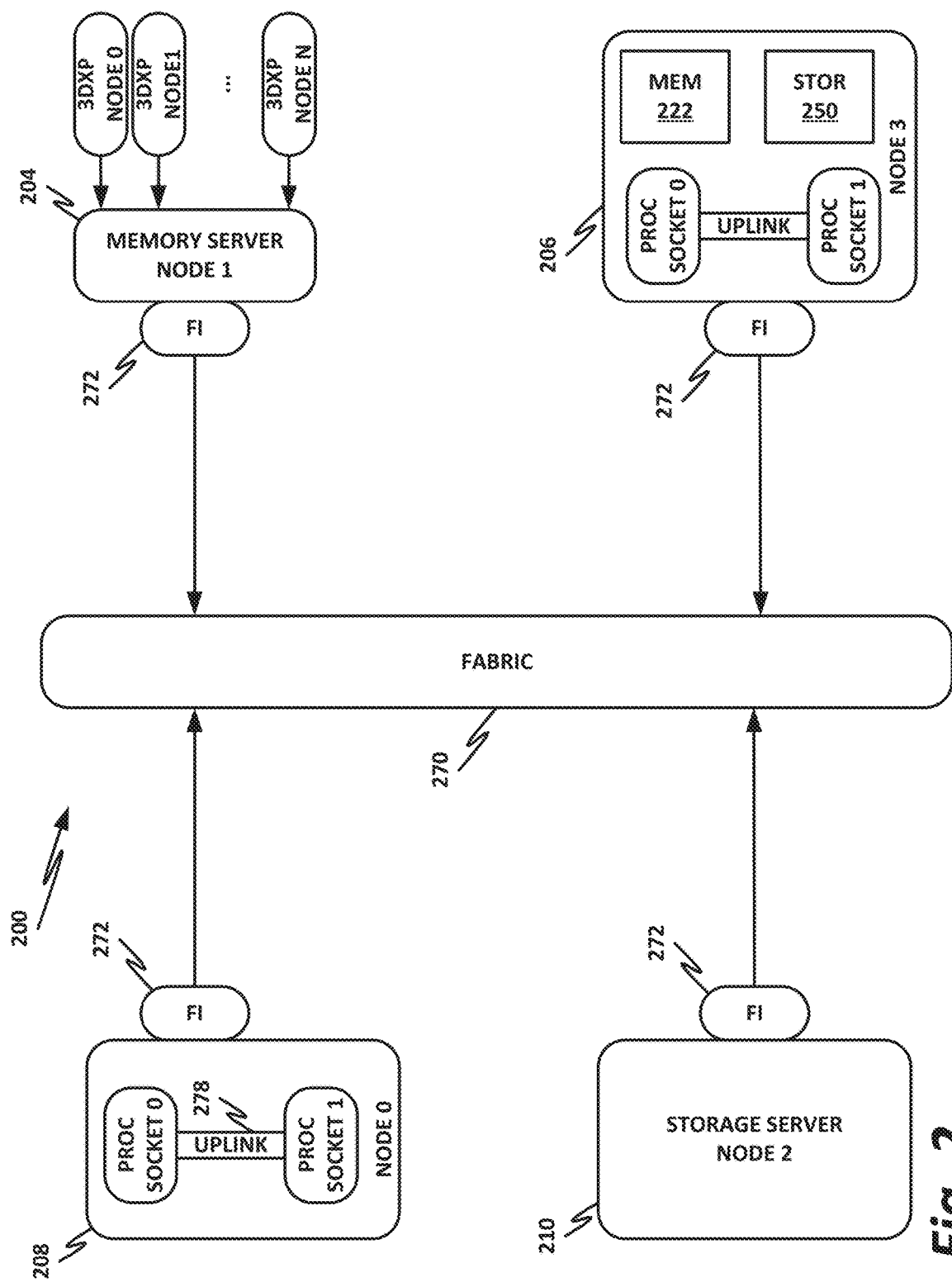
FIG. 2 is a block diagram of a data center according to one or more examples of the present specification.

FIG. 2 is a block diagram of a data center 200 according to one or more examples of the present specification. Data center 200 may be, in various embodiments, the same data center as Data Center 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® OmniPath™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® Host Fabric Interface for connecting to an Intel® OmniPath™ fabric. In some examples, communication with fabric 270 may be tunneled, such as by providing UPI tunneling over OmniPath™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
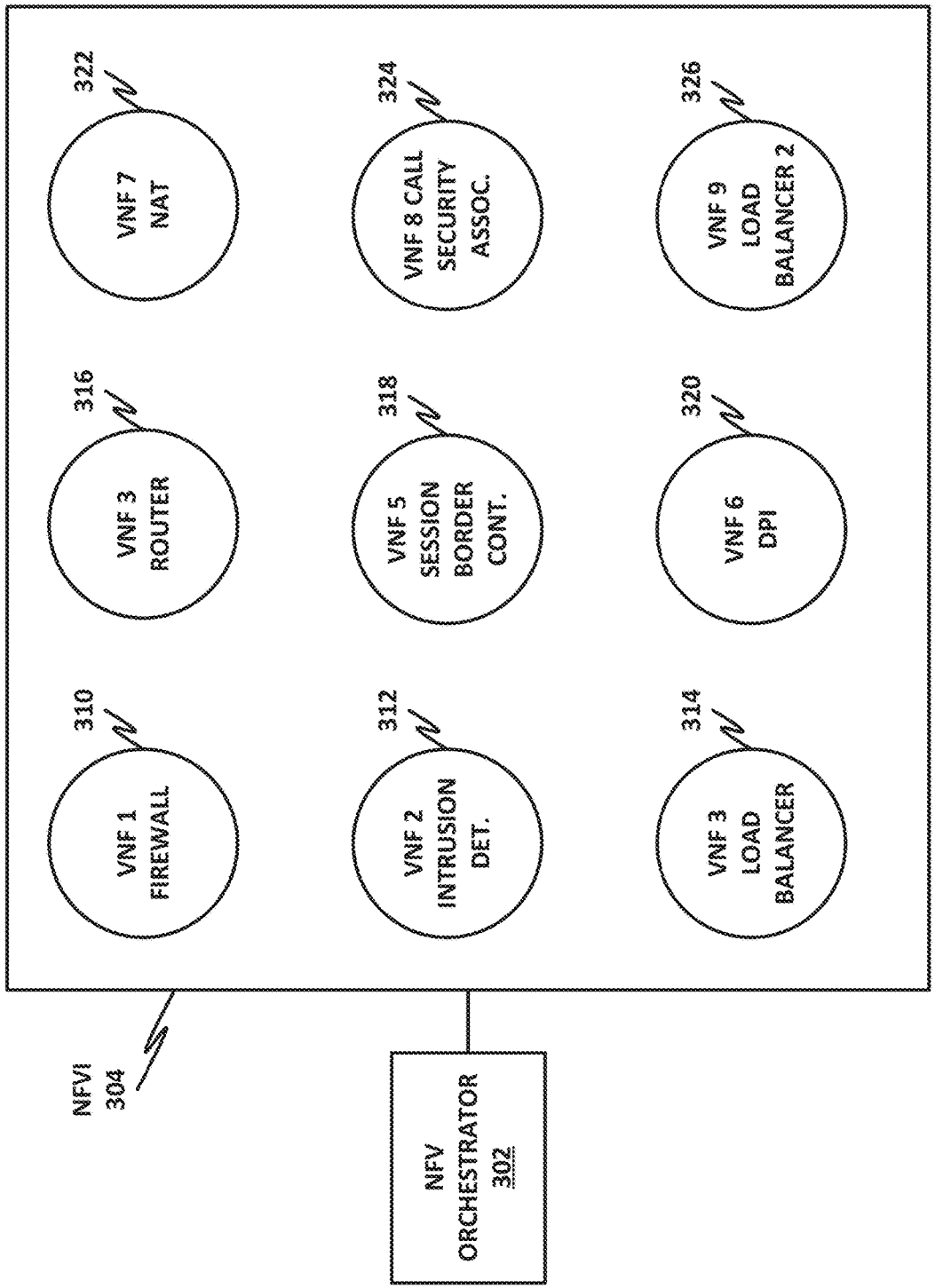
FIG. 3 is a block diagram of a network function virtualization (NFV) architecture according to one or more examples of the present specification.

FIG. 3 is a block diagram of a network function virtualization (NFV) architecture according to one or more examples of the present specification. NFV is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

The illustrations of this in FIG. 3 may be considered more functional, compared to more high-level, logical network layouts. Like SDN, NFV is a subset of network virtualization. 4In other words, certain portions of the network may rely on SDN, while other portions (or the same portions) may rely on NFV.

In the example of FIG. 3, an NFV orchestrator 302 manages a number of the VNFs running on an NFVI 304. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 302.

Note that NFV orchestrator 302 itself is usually virtualized (rather than a special-purpose hardware appliance). NFV orchestrator 302 may be integrated within an existing SDN system, wherein an operations support system (OSS) manages the SDN. This may interact with cloud resource management systems (e.g., OpenStack) to provide NFV orchestration. An NFVI 304 may include the hardware, software, and other infrastructure to enable VNFs to run. This may include a rack or several racks of blade or slot servers (including, e.g., processors, memory, and storage), one or more data centers, other hardware resources distributed across one or more geographic locations, hardware switches, or network interfaces. An NFVI 304 may also include the software architecture that enables hypervisors to run and be managed by NFV orchestrator 302. Running on NFVI 304 are a number of virtual machines, each of which in this example is a VNF providing a virtual service appliance. These include, as nonlimiting and illustrative examples, VNF 1 310, which is a firewall, VNF 2 312, which is an intrusion detection system, VNF 3 314, which is a load balancer, VNF 4 316, which is a router, VNF 5 318, which is a session border controller, VNF 6 320, which is a deep packet inspection (DPI) service, VNF 7 322, which is a network address translation (NAT) module, VNF 8 324, which provides call security association, and VNF 9326, which is a second load balancer spun up to meet increased demand.

Firewall 310 is a security appliance that monitors and controls the traffic (both incoming and outgoing), based on matching traffic to a list of "firewall rules." Firewall 310 may be a barrier between a relatively trusted (e.g., internal) network, and a relatively untrusted network (e.g., the Internet). Once traffic has passed inspection by firewall 310, it may be forwarded to other parts of the network.

Intrusion detection 312 monitors the network for malicious activity or policy violations. Incidents may be reported to a security administrator, or collected and analyzed by a security information and event management (SIEM) system. In some cases, intrusion detection 312 may also include antivirus or antimalware scanners.

Load balancers 314 and 326 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 316 forwards packets between networks or subnetworks. For example, router 316 may include one or more ingress interfaces, and a plurality of egress interfaces, with each egress interface being associated with a resource, subnetwork, virtual private network, or other division. When traffic comes in on an ingress interface, router 316 determines what destination it should go to, and routes the packet to the appropriate egress interface.

Session border controller 318 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 320 provides deep packet inspection, including examining not only the header, but also the content of a packet to search for potentially unwanted content (PUC), such as protocol non-compliance, malware, viruses, spam, or intrusions.

NAT module 322 provides network address translation services to remap one IP address space into another (e.g., mapping addresses within a private subnetwork onto the larger internet).

Call security association 324 creates a security association for a call or other session (see session border controller 318 above). Maintaining this security association may be critical, as the call may be dropped if the security association is broken.

The illustration of FIG. 3 shows that a number of VNFs have been provisioned and exist within NFVI 304. This figure does not necessarily illustrate any relationship between the VNFs and the larger network.

Figure 4:
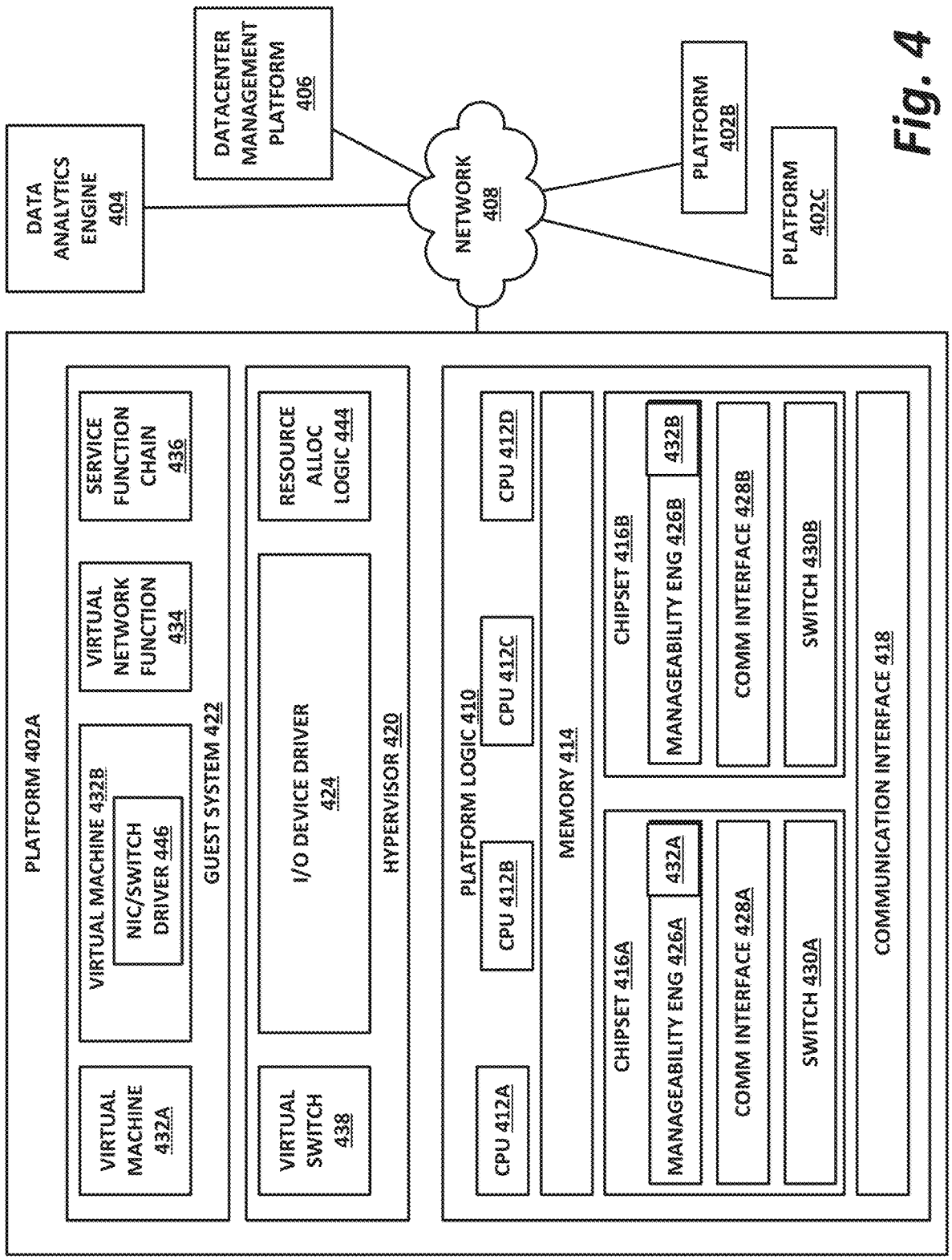
FIG. 4 illustrates a block diagram of components of a computing platform according to one or more examples of the present specification.

FIG. 4 illustrates a block diagram of components of a computing platform 402A according to one or more examples of the present specification. In the embodiment depicted, platforms QF02A, 402B, and 402C, along with a data center management platform 406 and data analytics engine 404 are interconnected via network 408. In other embodiments, a computer system may include any suitable number of (i.e., one or more) platforms. In some embodiments (e.g., when a computer system only includes a single platform), all or a portion of the system management platform 406 may be included on a platform 402. A platform 402 may include platform logic 410 with one or more central processing units (CPUs) 412, memories 414 (which may include any number of different modules), chipsets 416, communication interfaces 418, and any other suitable hardware and/or software to execute a hypervisor 420 or other operating system capable of executing workloads associated with applications running on platform 402. In some embodiments, a platform 402 may function as a host platform for one or more guest systems 422 that invoke these applications. Platform 402A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 406, hypervisor 420, or other operating system) of computer platform 402A may assign hardware resources of platform logic 410 to perform workloads in accordance with the stress information. In some embodiments, self-diagnostic capabilities may be combined with the stress monitoring to more accurately determine the health of the hardware resources. Each platform 402 may include platform logic 410. Platform logic 410 comprises, among other logic enabling the functionality of platform 402, one or more CPUs 412, memory 414, one or more chipsets 416, and communication interfaces 428. Although three platforms are illustrated, computer platform 402A may be interconnected with any suitable number of platforms. In various embodiments, a platform 402 may reside on a circuit board that is installed in a chassis, rack, or other suitable structure that comprises multiple platforms coupled together through network 408 (which may comprise, e.g., a rack or backplane switch).

CPUs 412 may each comprise any suitable number of processor cores and supporting logic (e.g., uncores). The cores may be coupled to each other, to memory 414, to at least one chipset 416, and/or to a communication interface 418, through one or more controllers residing on CPU 412 and/or chipset 416. In particular embodiments, a CPU 412 is embodied within a socket that is permanently or removably coupled to platform 402A. Although four CPUs are shown, a platform 402 may include any suitable number of CPUs.

Memory 414 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 414 may be used for short, medium, and/or long term storage by platform 402A. Memory 414 may store any suitable data or information utilized by platform logic 410, including software embedded in a computer readable medium, and/or encoded logic incorporated in hardware or otherwise stored (e.g., firmware). Memory 414 may store data that is used by cores of CPUs 412. In some embodiments, memory 414 may also comprise storage for instructions that may be executed by the cores of CPUs 412 or other processing elements (e.g., logic resident on chipsets 416) to provide functionality associated with the manageability engine 426 or other components of platform logic 410. A platform 402 may also include one or more chipsets 416 comprising any suitable logic to support the operation of the CPUs 412. In various embodiments, chipset 416 may reside on the same die or package as a CPU 412 or on one or more different dies or packages. Each chipset may support any suitable number of CPUs 412. A chipset 416 may also include one or more controllers to couple other components of platform logic 410 (e.g., communication interface 418 or memory 414) to one or more CPUs. In the embodiment depicted, each chipset 416 also includes a manageability engine 426. Manageability engine 426 may include any suitable logic to support the operation of chipset 416. In a particular embodiment, a manageability engine 426 (which may also be referred to as an innovation engine) is capable of collecting real-time telemetry data from the chipset 416, the CPU(s) 412 and/or memory 414 managed by the chipset 416, other components of platform logic 410, and/or various connections between components of platform logic 410. In various embodiments, the telemetry data collected includes the stress information described herein.

In various embodiments, a manageability engine 426 operates as an out-of-band asynchronous compute agent which is capable of interfacing with the various elements of platform logic 410 to collect telemetry data with no or minimal disruption to running processes on CPUs 412. For example, manageability engine 426 may comprise a dedicated processing element (e.g., a processor, controller, or other logic) on chipset 416, which provides the functionality of manageability engine 426 (e.g., by executing software instructions), thus conserving processing cycles of CPUs 412 for operations associated with the workloads performed by the platform logic 410. Moreover the dedicated logic for the manageability engine 426 may operate asynchronously with respect to the CPUs 412 and may gather at least some of the telemetry data without increasing the load on the CPUs.

A manageability engine 426 may process telemetry data it collects (specific examples of the processing of stress information will be provided herein). In various embodiments, manageability engine 426 reports the data it collects and/or the results of its processing to other elements in the computer system, such as one or more hypervisors 420 or other operating systems and/or system management software (which may run on any suitable logic such as system management platform 406). In particular embodiments, a critical event such as a core that has accumulated an excessive amount of stress may be reported prior to the normal interval for reporting telemetry data (e.g., a notification may be sent immediately upon detection).

Additionally, manageability engine 426 may include programmable code configurable to set which CPU(s) 412 a particular chipset 416 will manage and/or which telemetry data will be collected.

Chipsets 416 also each include a communication interface 428. Communication interface 428 may be used for the communication of signaling and/or data between chipset 416 and one or more I/O devices, one or more networks 408, and/or one or more devices coupled to network 408 (e.g., system management platform 406). For example, communication interface 428 may be used to send and receive network traffic such as data packets. In a particular embodiment, a communication interface 428 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 416 (e.g., manageability engine 426 or switch 430) and another device coupled to network 408. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 428 may allow communication of data (e.g., between the manageability engine 426 and the data center management platform 406) associated with management and monitoring functions performed by manageability engine 426. In various embodiments, manageability engine 426 may utilize elements (e.g., one or more NICs) of communication interfaces 428 to report the telemetry data (e.g., to system management platform 406) in order to reserve usage of NICs of communication interface 418 for operations associated with workloads performed by platform logic 410.

Switches 430 may couple to various ports (e.g., provided by NICs) of communication interface 428 and may switch data between these ports and various components of chipset 416 (e.g., one or more Peripheral Component Interconnect Express (PCIe) lanes coupled to CPUs 412). Switches 430 may be a physical or virtual (i.e., software) switch.

Platform logic 410 may include an additional communication interface 418. Similar to communication interfaces 428, communication interfaces 418 may be used for the communication of signaling and/or data between platform logic 410 and one or more networks 408 and one or more devices coupled to the network 408. For example, communication interface 418 may be used to send and receive network traffic such as data packets. In a particular embodiment, communication interfaces 418 comprise one or more physical NICs. These NICs may enable communication between any suitable element of platform logic 410 (e.g., CPUs 512 or memory 514) and another device coupled to network 408 (e.g., elements of other platforms or remote computing devices coupled to network 408 through one or more networks).

Platform logic 410 may receive and perform any suitable types of workloads. A workload may include any request to utilize one or more resources of platform logic 410, such as one or more cores or associated logic. For example, a workload may comprise a request to instantiate a software component, such as an I/O device driver 424 or guest system 422; a request to process a network packet received from a virtual machine 432 or device external to platform 402A (such as a network node coupled to network 408); a request to execute a process or thread associated with a guest system 422, an application running on platform 402A, a hypervisor 420 or other operating system running on platform 402A; or other suitable processing request.

A virtual machine 432 may emulate a computer system with its own dedicated hardware. A virtual machine 432 may run a guest operating system on top of the hypervisor 420. The components of platform logic 410 (e.g., CPUs 412, memory 414, chipset 416, and communication interface 418) may be virtualized such that it appears to the guest operating system that the virtual machine 432 has its own dedicated components.

A virtual machine 432 may include a virtualized NIC (vNIC), which is used by the virtual machine as its network interface. A vNIC may be assigned a media access control (MAC) address or other identifier, thus allowing multiple virtual machines 432 to be individually addressable in a network.

VNF 434 may comprise a software implementation of a functional building block with defined interfaces and behavior that can be deployed in a virtualized infrastructure. In particular embodiments, a VNF 434 may include one or more virtual machines 432 that collectively provide specific functionalities (e.g., wide area network (WAN) optimization, virtual private network (VPN) termination, firewall operations, load-balancing operations, security functions, etc.). A VNF 434 running on platform logic 410 may provide the same functionality as traditional network components implemented through dedicated hardware. For example, a VNF 434 may include components to perform any suitable NFV workloads, such as virtualized evolved packet core (vEPC) components, mobility management entities, 3rd Generation Partnership Project (3GPP) control and data plane components, etc.

SFC 436 is a group of VNFs 434 organized as a chain to perform a series of operations, such as network packet processing operations. Service function chaining may provide the ability to define an ordered list of network services (e.g. firewalls, load balancers) that are stitched together in the network to create a service chain.

A hypervisor 420 (also known as a virtual machine monitor) may comprise logic to create and run guest systems 422. The hypervisor 420 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 410. Services of hypervisor 420 may be provided by virtualizing in software or through hardware assisted resources that require minimal software intervention, or both. Multiple instances of a variety of guest operating systems may be managed by the hypervisor 420. Each platform 402 may have a separate instantiation of a hypervisor 420.

Hypervisor 420 may be a native or bare-metal hypervisor that runs directly on platform logic 410 to control the platform logic and manage the guest operating systems. Alternatively, hypervisor 420 may be a hosted hypervisor that runs on a host operating system and abstracts the guest operating systems from the host operating system. Hypervisor 420 may include a virtual switch 438 that may provide virtual switching and/or routing functions to virtual machines of guest systems 422. The virtual switch 438 may comprise a logical switching fabric that couples the vNICs of the virtual machines 432 to each other, thus creating a virtual network through which virtual machines may communicate with each other.

Virtual switch 438 may comprise a software element that is executed using components of platform logic 410. In various embodiments, hypervisor 420 may be in communication with any suitable entity (e.g., a SDN controller) which may cause hypervisor 420 to reconfigure the parameters of virtual switch 438 in response to changing conditions in platform 402 (e.g., the addition or deletion of virtual machines 432 or identification of optimizations that may be made to enhance performance of the platform).

Hypervisor 420 may also include resource allocation logic 444, which may include logic for determining allocation of platform resources based on the telemetry data (which may include stress information). Resource allocation logic 444 may also include logic for communicating with various components of platform logic 410 entities of platform 402A to implement such optimization, such as components of platform logic 410.

Any suitable logic may make one or more of these optimization decisions. For example, system management platform 406; resource allocation logic 444 of hypervisor 420 or other operating system; or other logic of computer platform 402A may be capable of making such decisions. In various embodiments, the system management platform 406 may receive telemetry data from and manage workload placement across multiple platforms 402. The system management platform 406 may communicate with hypervisors 420 (e.g., in an out-of-band manner) or other operating systems of the various platforms 402 to implement workload placements directed by the system management platform.

The elements of platform logic 410 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 402A may be coupled together in any suitable manner such as through one or more networks 408. A network 408 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 5:
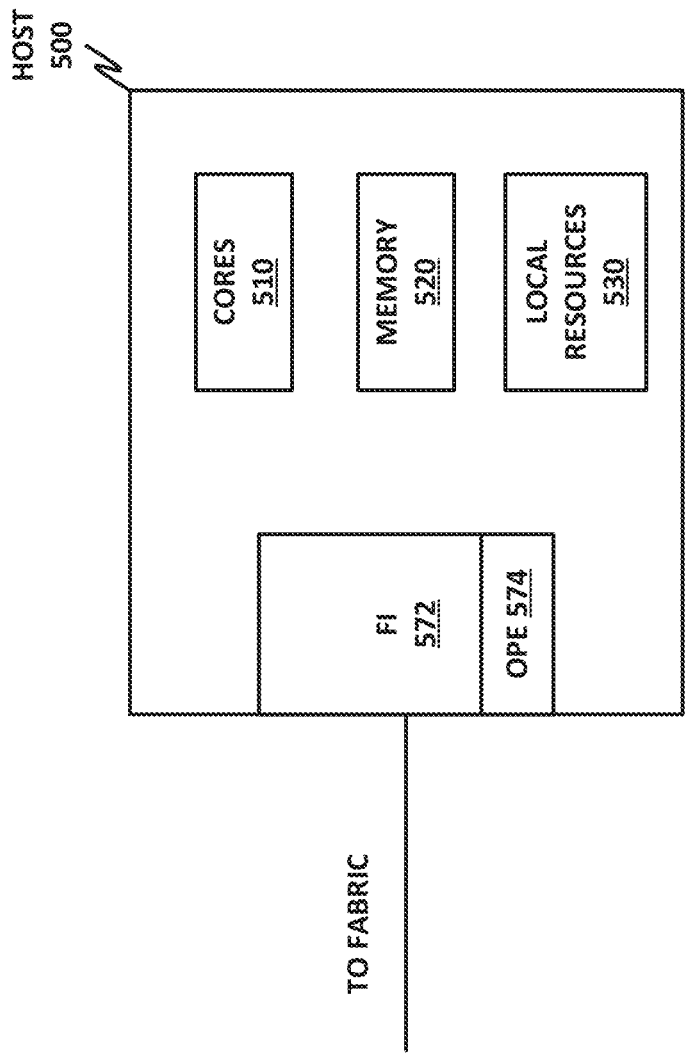
FIG. 5 is a block diagram of a host illustrating a high level overview of a fabric interface with an overload protection engine (OPE) according to one or more examples of the present specification.

FIG. 5 is a block diagram of a host 500 illustrating a high level overview of a fabric interface with an overload protection engine according to one or more examples of the present specification.

In this example, host 500 includes one or more cores 510, onboard memory 520, and other local resources 530, which may include for example storage, accelerators, peripheral interfaces, and other devices.

Host 500 communicatively couples to a fabric via fabric interface 572. In this context, the fabric should be understood to include any of the fabrics disclosed throughout this specification, including Ethernet, OmniPath, and other fabrics disclosed herein.

In this example, fabric interface 572 includes an overload protection engine (OPE) 574. OPE 574 may be a hardware and/or software engine implemented on fabric interface 572 to ensure that in potential overload conditions, excessive packets are not forwarded to cores 510 causing an overload condition on the cores.

Figure 6:
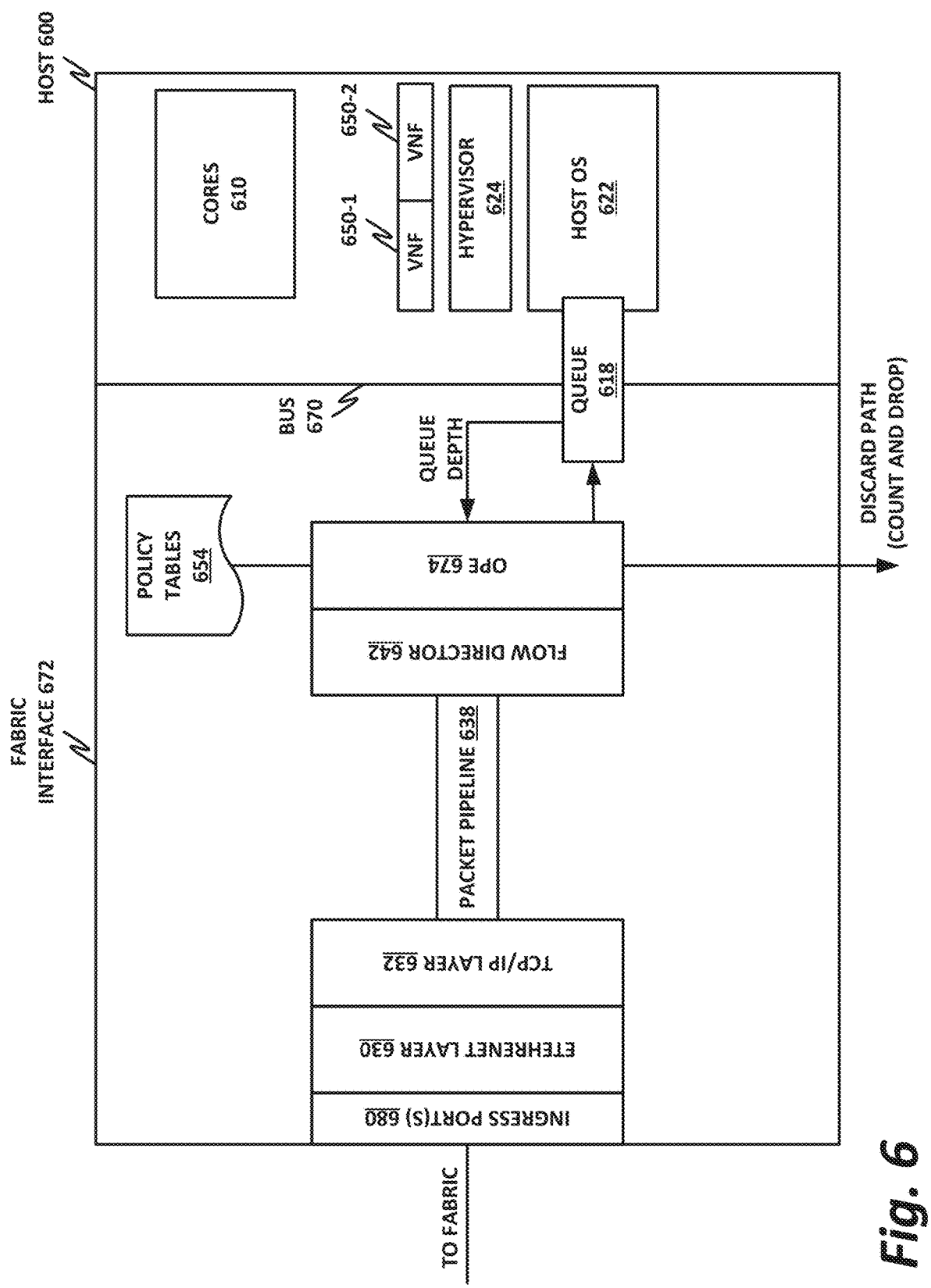
FIG. 6 is a more detailed example of a host including a fabric interface according to one or more examples of the present specification.

FIG. 6 is a more detailed example of a host 600 including a fabric interface 672 according to one or more examples of the present specification.

The example of FIG. 6 illustrates more specifically the virtualized nature of embodiments of the present specification. In this case, cores 610 are provided on host 600, and operate a host operating system 622. Host operating system 622 may be a minimal operating system that provides a hypervisor 624. Hypervisor 624 may be configured to dynamically provision and manage a plurality of VNFs 650, such as VNF 650-1 and VNF 650-2.

As before, fabric interface 672 includes an OPE 674, which may be virtualization aware, and which may be provided to classify and manage incoming traffic in overload type situations. OPE 674 is said to be virtualization aware in the sense that OPE 674 has visibility into the virtual nature of the VNFs or other virtual functions provided by host 600. OPE 674 may have an API or other interface to hypervisor 624, so that OPE 674 is aware of which VNFs are running, and what function each one is providing. This enables OPE 674 to make informed decisions about handling traffic.

In an example, traffic is received on ingress ports 680, which may be high-volume network traffic. Ingress ports 680 provide the incoming traffic to Ethernet layer 630, which should be understood to be any layer 1 or layer 2 type network protocol layer as described above.

Ethernet layer 630 forwards the packets to TCP/IP layer 632. TCP/IP layer 632 provides the packets to a flow director 642, which ultimately provides a packets to OPE 674.

Based on one or more policy tables 654, OPE 674 may make decisions about which packets to forward into queue 618, which is visible to host operating system 622. This decision may be informed, for example, by the queue depth, by information and policy table 654, and by information provided by hypervisor 624. When packets are found to be high-priority as disclosed herein, they are forwarded to queue 618 for handling by cores 610. When packets are found to be low priority, they are discarded via a discard path.

Note that OPE 674 provides its function only when the gateway condition of there being an overflow condition is met. An overflow condition is intended to include any condition wherein there is a present state overflow that will flood cores 610, and potentially cause gridlock within host 600. An overload condition may also include a case where network traffic is approaching such a present state overload, and it is determined that remedial action should be taken to prevent the overload from reaching a critical or problematic state. As described above, a hysteresis function may also be provided to smooth the operation of OPE 674. For example, if traffic bounces or jitters between just barely overloaded, and barely not overloaded, then OPE 674 may be constantly switching on and off providing a jittery network function. Thus, hysteresis may be used to ensure smooth operation of OPE 674, to ensure that it is turned on when it is needed, and remains on for a reasonable time to avoid network jitter.

When it is on, OPE 674 checks the queue depth associated with each VNF 650 before delivering packets to cores 610. If the queue depth exceeds a defined threshold, the hierarchical policing functions of a decision tree may check the policy associated with that virtual entity, and drop packets if they are determined to be low priority.

In some embodiments, optional sampling of dropped packets may be provided to a management entity of the compute node for further monitoring and analysis. This can be useful, for example, in conducting a postmortem inspection of the overload condition, and preventing future overload conditions.

Advantageously, OPE 674 provides the following by way of nonlimiting example:

1. Noisy neighbor protection for VNFs, by specifying priority delivery and rate limiting of traffic to VNFs.
2. Prevents one virtual connection's traffic from flooding a VNF (overlay protocols and tunnels), by specifying priority and rate limiting.
3. Prevents one protocol type from flooding a VNF by specifying priority and rate limiting.
4. Prevents one traffic class from flooding a VNF by specifying priority and rate limiting.

Figure 7:
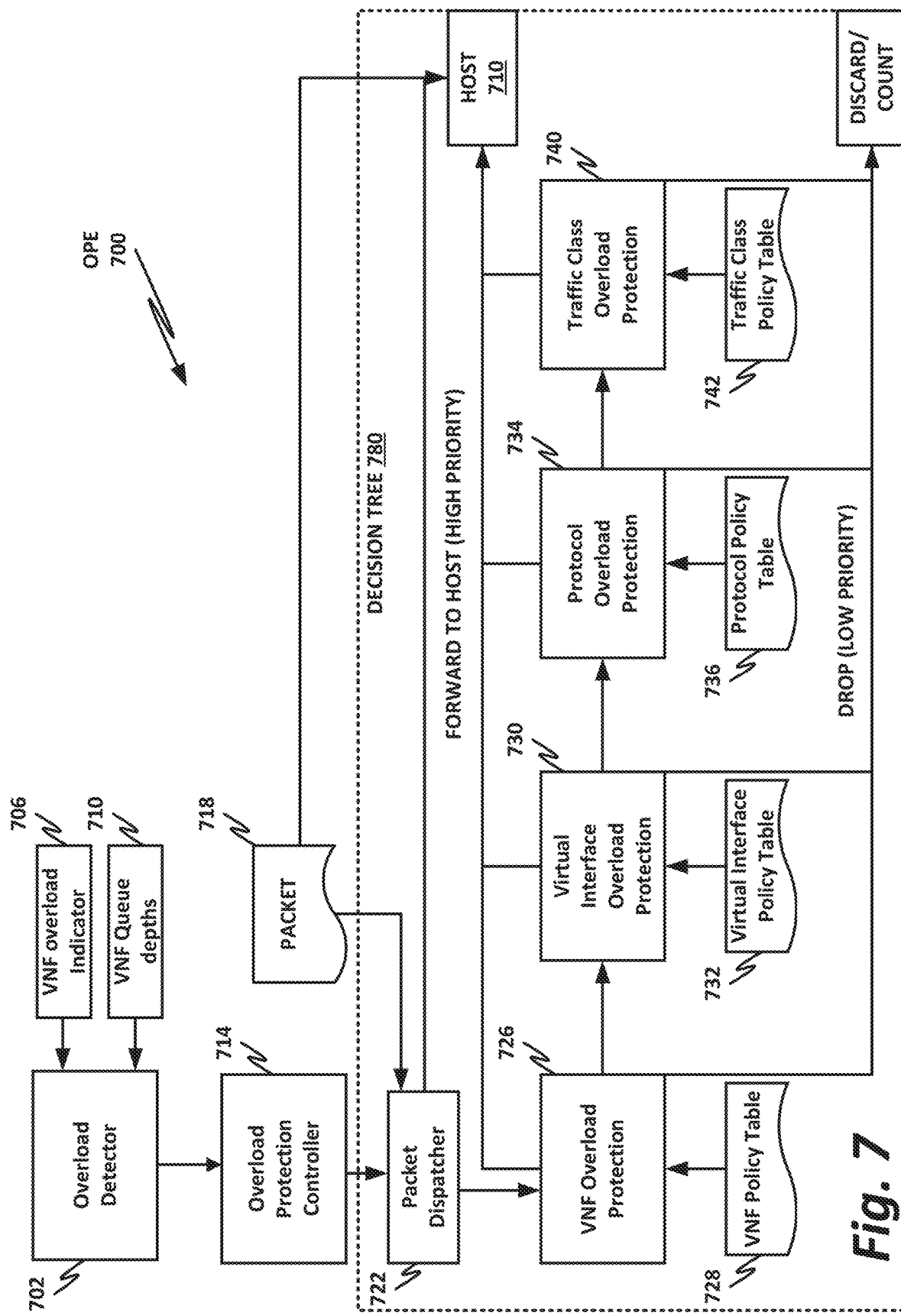
FIG. 7 is a block diagram of an OPE according to one or more examples of the present specification.

FIG. 7 is a block diagram of an OPE 700 according to one or more examples of the present specification. The illustration of FIG. 7 should be understood to be a nonlimiting and illustrative embodiment of an OPE 700. In certain embodiments, some of the elements of OPE 700 may be omitted, while in other embodiments, other elements may be added without departing from the scope of the of the present claims.

In the example of OPE 700, an overload detector 702 provides analysis of overload conditions. In this example, OPE 700 includes a decision tree 780, which performs a multistage inspection of traffic to determine whether traffic is to be forwarded to the host (high priority traffic), or whether traffic is to be discarded (low priority traffic).

Overload detector 702 may be provided to detect present state or imminent overload conditions. Inputs to overload detector 702 may include VNF queue depths 710, indicating to what depth the cues for each VNF are filled, and a VNF overload indicator 706, which may be a measure of incoming or in-flight traffic volume. By inspecting VNF overload indicator 706 and VNF queue depths 710, overload detector 702 may determine whether a traffic overload condition is present or imminent. Whether the overload is present or imminent, it may be referred to generically as an "overload condition." Overload detector 702 may compare its analysis of VNF overload indicator 706 and VNF queue depths 710 to internal thresholds, and if the threshold is exceeded, it may provide an indication to overload protection controller 714.

Overload protection controller 714 receives the overload condition input from overload detector 702, and determines whether to enable or disable OPE 700. The decision to enable or disable OPE 700 may be a nontrivial decision that accounts for more than just the presence of an overload condition signal from overload detector 702. For example, overload protection controller 714 may employ a hysteresis function, to avoid situations where the overload condition signal from overload detector 702 jitters up and down above and below a threshold. In those cases, overload protection controller 714 could continuously switch OPE 700 on and off, thus introducing jitter into the handling of the network function. In many cases, it is preferable to provide a smoothly functioning OPE 700, and the hysteresis function may be used to ensure that OPE 700 turns on in enough time to handle the imminent overload condition, and remains on until network conditions have returned to a reasonable state so that traffic can reasonably be handled.

If OPE 780 is off, then packets 718 are routed directly to host 710, where they are provided to the various cues for the VNFs, and handled appropriately.

Once overload protection controller 714 determines that OPE 700 should be turned on, then packets are instead routed first to packet dispatcher 722. Packet dispatcher 722 may include a simple four-stage analysis to identify the highest priority packets. This may be in some cases a relatively short list of packet types or designations that may be matched, for example, by pattern matching so that these packets are always provided to host 710. For example, a critical packet such as a failover protocol message, a heartbeat, or a routing table update may be matched by packet dispatcher 722 and provided to host 710. This ensures that none of these highest priority packets are lost in further analysis, and also ensures that compute resources within OPE 700 are not expended on further analyzing these packets.

If packet dispatcher 722 does not determine that a packet is of highest priority and forward it to host 710, then packet dispatcher 722 may instead forward on the packet to the decision tree 780.

Decision tree 780 is a multistage tree, in which packets are inspected in a defined order, and where in each stage a packet may be forwarded to the host, discarded, or forwarded to the next stage in decision tree 780. In this example, each stage of decision tree 780 includes an appropriate policy table that may be used to match certain classes of traffic to determine which types of traffic should be forwarded to host 710, dropped, or forwarded to the next stage of decision tree 780.

Each overload protection function in decision tree 780 may provide, by way of example, four methods of protection, which may be programmed by the appropriate policy table. These include:

1. A policing (rate control) function.
2. Unconditional discard.
3. Conditional discard, based for example on a low and high watermark threshold to support hysteresis of packet discards.
4. Forward to another policy, meaning that this protection function has not determined definitively whether the packet should be kept or discarded.

Each overload protection function in decision tree 780 may perform ingress traffic policing (rate limiting) when the queue depth reaches a maximum size, or the traffic rate reaches a configured maximum rate. Excess traffic is dropped based on the multilevel hierarchy of decision tree 780.

Each policy table in decision tree 780 includes, by way of nonlimiting example, a plurality of policy entries. Each policy entry may include, by way of nonlimiting example:

a. An entry ID (including a VNF identifier, queue, virtual interface, protocol class, or traffic class).
b. Priority.
c. Committed information rate (CIR)/excess information rate (EIR) for rate limiting.
d. Minimum and maximum queue depths for conditional discards.
e. An action, such as rate limit, conditional discard, unconditional discard, or pass to the next level.

Furthermore, each protection unit in decision tree 780 may mark low priority packets to be dropped when the VNF queue is overloaded.

By way of nonlimiting example, in this case decision tree 780 includes VNF overload protection 726, virtual interface overload protection 730, protocol overload protection 734, and traffic class overload protection 740.

VNF overload protection 726 is informed by a VNF policy table 728. This may provide, for example, prioritization of which VNFs are to receive traffic, or which VNFs provide the most important functions. For example, if a VNF provides a critical security function, it may be desirable to always forward packets for that VNF. On the other hand, if another VNF provides a lower priority function, such as traffic statistics, it may be more acceptable to drop packets for that VNF.

Virtual interface overload protection 730 is informed by a virtual interface policy table 732, and is provided to ensure that the various virtual interfaces do not become overloaded. This may provide, for example, priority of which virtual interfaces are more important than others, or may be crafted by a load balancing function.

Protocol overload protection 734 is informed by a protocol policy table 736. In this case, the protocol of an incoming packet may be inspected to determine which type of protocol the traffic targets. For example, in the case of an HTTP packet, the result of dropping the packet in an overload situation may simply be that there is some jitter or delay in a user loading a webpage. In contrast, there may be a relatively higher cost in dropping a packet for an RTPS protocol providing real-time data distribution services. Thus, certain protocols may be given priority over other protocols.

Traffic class overload protection 740 is informed by traffic class policy table 742. This may provide an overall level of different types of traffic classes, and their priorities. For example, regular webpage traffic may be of lower priority than multimedia traffic that may be required to be lossless to operate correctly. Thus, traffic class overload protection block 740 may classify each incoming packet and determined whether it is to be discarded or forwarded.

In this example, traffic class overload protection 740 is the last link in the chain of decision tree 780. If traffic is not designated as important in traffic class overload protection 740, it is designated as low priority and discarded rather than forwarded to another link in decision tree 780. If traffic is finally determined at this stage to be high priority, it is forwarded to host 710.

It should be noted that the location and arrangement of elements of decision tree 780 are provided by way of nonlimiting example only, and other agents may be used according to the needs of a particular embodiment.

Figure 8:
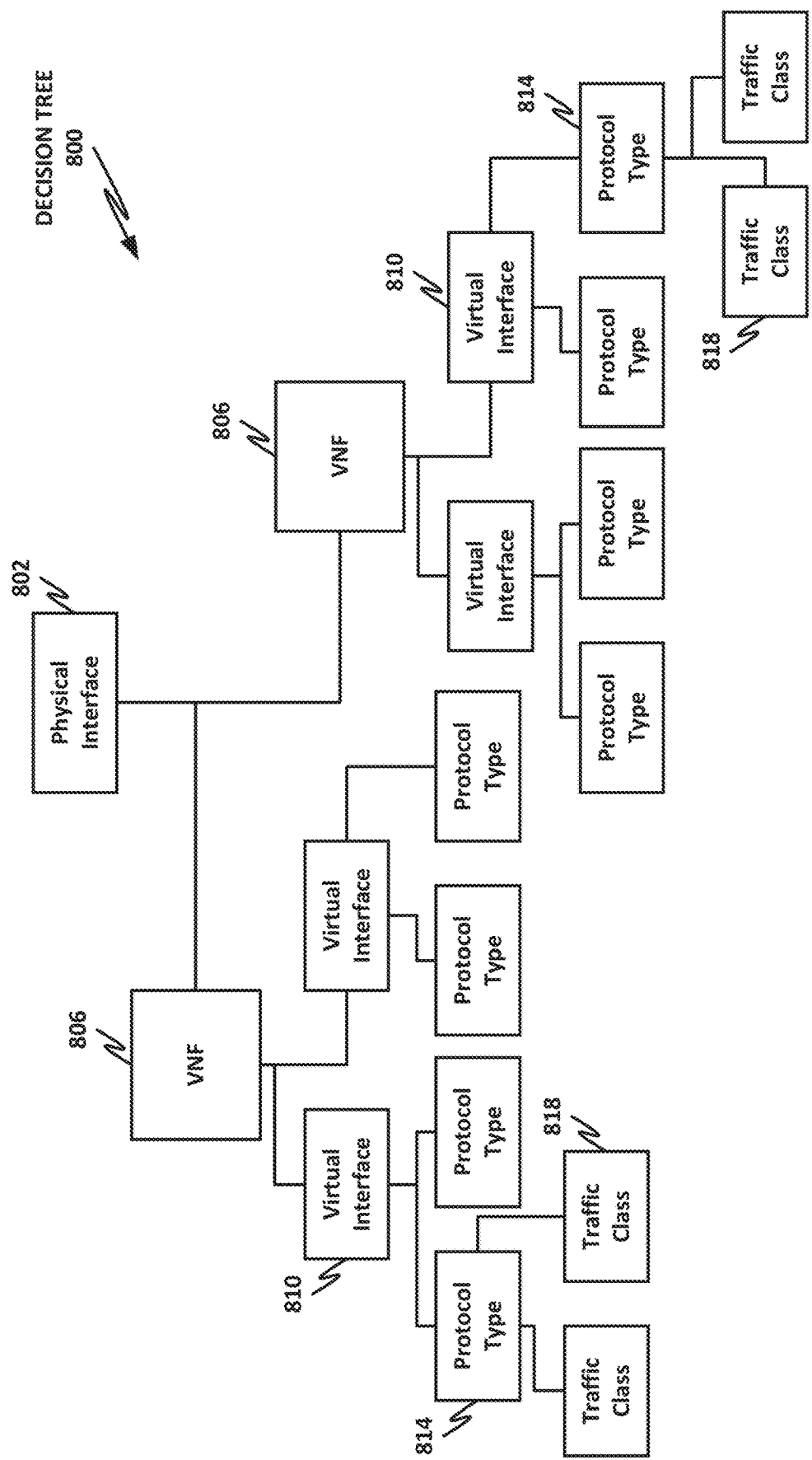
FIG. 8 is a block diagram of a decision tree illustrating graphically the operation of a decision tree according to one or more examples of the present specification.

In this example, decision tree 780 starts with a VNF overload protection block 726. VNF overload protection block 726 is fed by a VNF policy table 728. FIG. 8 is a block diagram of a decision tree 800 illustrating graphically the operation of a decision tree according to one or more examples of the present specification. It can be seen in this example that a physical interface 802 feeds the various levels of decision tree 800. At each level, a plurality of policies may be provided for a plurality of values.

For example, at level 1 806 of decision tree 800, a VNF identity is inspected. Because there is a plurality of VNFs provided by the system, there may be a different policy defined for each VNF. The policy for that VNF may then branch off into level 2 810, where a plurality of virtual interfaces may be defined.

Virtual interfaces at level 2 810 may further branch off into protocol types at level 3 814. Thus, at level 3, a policy may be provided for each protocol type.

Finally, at level 4 818, traffic classes are inspected. Note that in this illustrative example, the various levels of decision tree 800 do not exist independently of each other. Rather, the policy for a traffic class at level 4 818 may be tied up to a level 3 protocol type, a level 2 virtual interface, and a level 1 VNF. However, this is a nonlimiting example, and in other embodiments, each level of decision tree 800 may be independent of the others.

Figure 9:
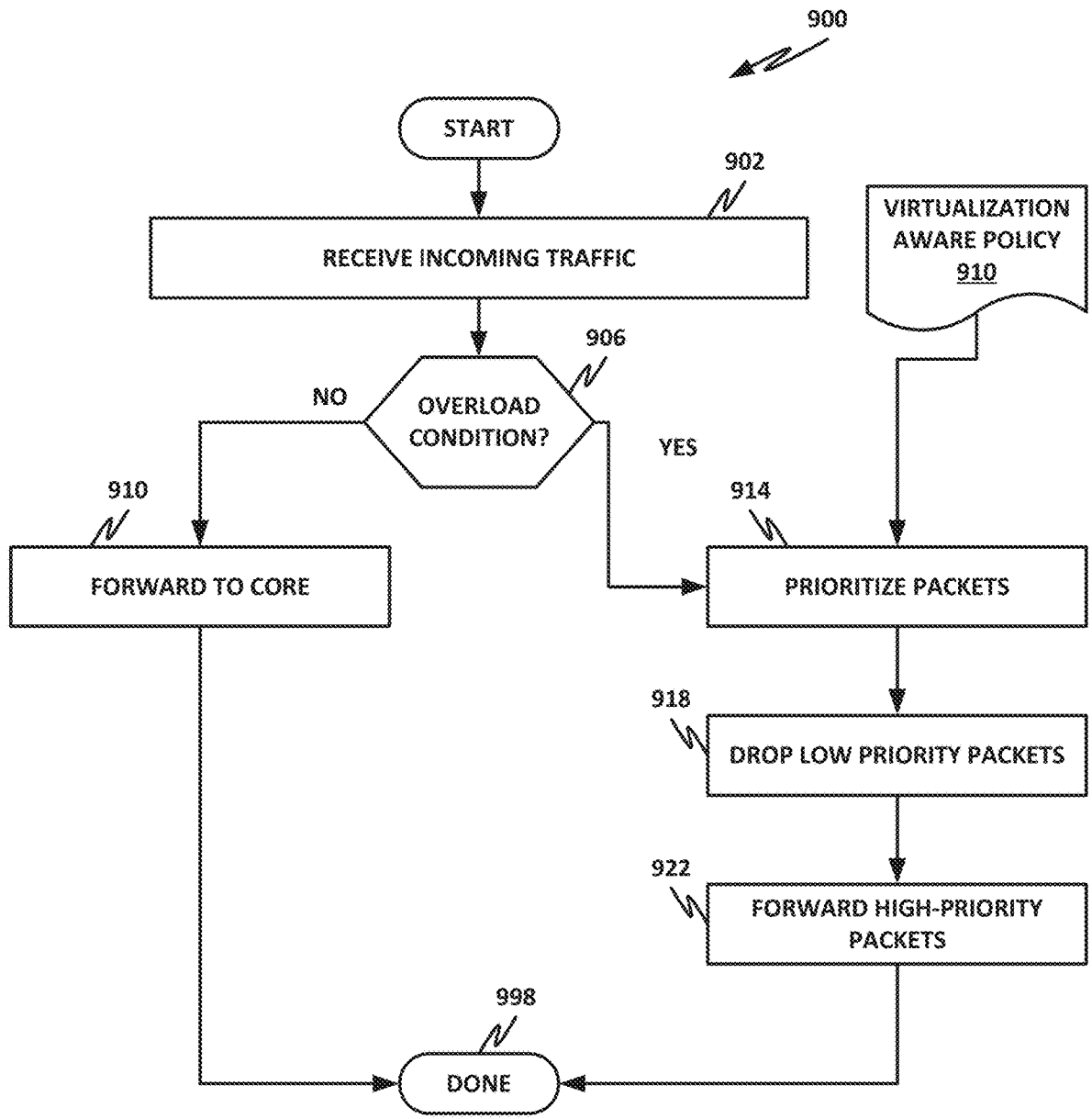
FIG. 9 is a flowchart of a method of performing overload protection according to one or more examples of the present specification.

FIG. 9 is a flowchart of a method 900 of performing overload protection according to one or more examples of the present specification.

In block 902, the system receives incoming traffic.

In decision block 906, the system determines whether there is an overload condition. As discussed elsewhere in this specification, the overload condition may indicate a current or present state overload, or a predicted or anticipated overload. As also discussed throughout the specification, the decision of whether to treat the network state as an overload condition in whether to enable overload protection may be informed by a smoothing function such as hysteresis.

If there is no overload condition, then in block 810, the fabric interface simply forwards the incoming packet to the cores of the host, and in block 998, the method is done.

Returning to decision block 906, if there is an overload condition, then overload protection may be enabled, and in block 914, an overload protection engine may begin to prioritize packets. This prioritization may be informed by a virtualization aware policy 910. The prioritization may be performed, by an overload protection engine such as OPE 700 of FIG. 7.

After prioritizing packets, the system designates them as either low priority packets or high priority packets.

In block 918, low priority packets are dropped, and optionally they may be counted, or may be sampled for later postmortem analysis.

In block 922, high priority packets are forwarded to the cores.

In block 998, the method is done.

Figure 10:
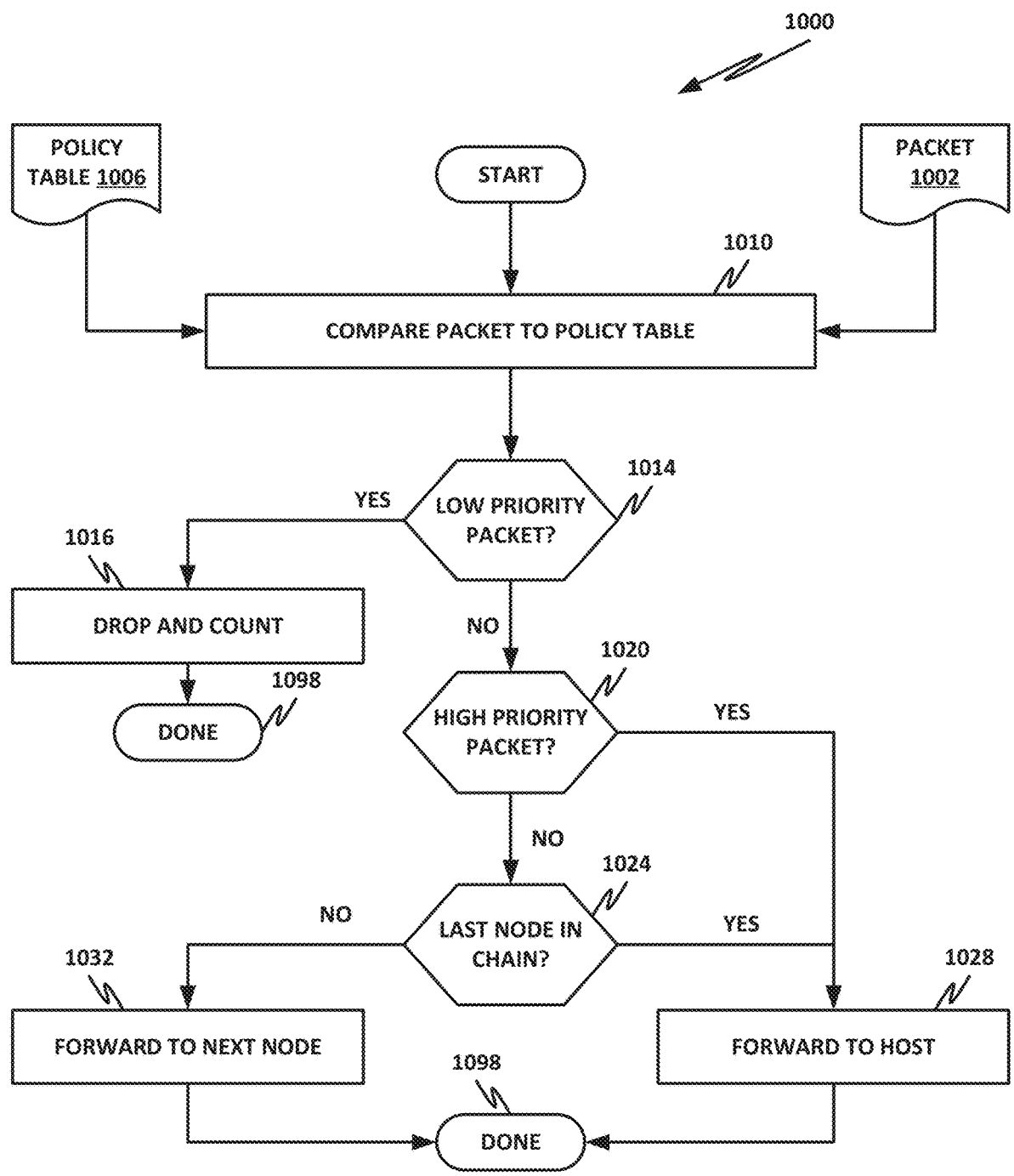
FIG. 10 is a flowchart of a method of providing a protection function according to one or more examples of the present specification.

FIG. 10 is a flowchart of a method 1000 of providing a protection function according to one or more examples of the present specification. This may be a method performed by any of the protection functions provided by decision tree 780 of FIG. 7, or of other protection functions disclosed herein. By way of nonlimiting example, protection functions illustrated in this specification include VNF overload protection 726, virtual interface overload protection 730, protocol overload protection 734, and traffic class overload protection 740.

In block 1010, the protection function receives an incoming packet 1002, and compares the packet to its policy table 1006. Policy table 1006 may be any of the policy tables disclosed in FIG. 7, or any other suitable policy table.

In decision block 1014, the protection function determines whether the packet is a low priority packet. If the packet is a low priority packet, then in block 1016, the packet is dropped and optionally counted. In block 1098, the method is done.

Returning to decision block 1014, if packet 1002 is not determined to be a low priority packet, then in decision block 1020, the protection function determines whether this is a high priority packet.

If this is a high party packet, then in block 1028, the packet is forwarded to the host, and in block 1098, the method is done.

In returning to decision block 1020, if the packet is not determined to be either a low priority packet or a high party packet, then in decision block 1024, the protection function determines whether it is the last node in the chain of the decision tree.

If the protection function is not the last node in the chain, then in block 1032, packet 1002 is forwarded to the next node in the decision tree, and in block 1098, the method is done.

Returning to decision block 1024, if this is the last node in the chain, then the packet has not definitively been determined to be low priority, and thus in block 1028, the packet may be forwarded to the host, and in block 1098, the method is done.

In an alternative embodiment, depending on the configuration and the needs of a particular deployment, this branch of decision block 1024 could also route to block 1016, in which case the default action if a packet is not determined to be either high or low priority is to drop the packet rather than to forward it to the host. The determination of whether to default to forwarding or dropping the packet will depend on the needs of a specific implementation, and is an exercise of ordinary skill.

Figure 11:
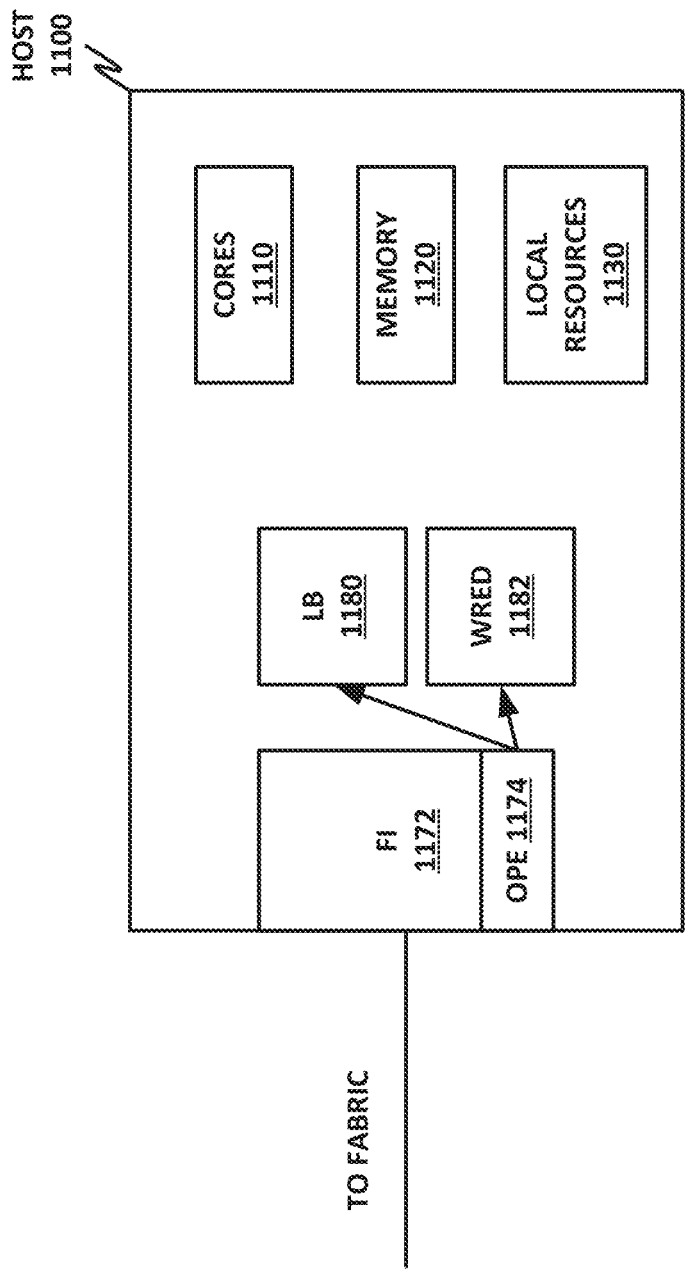
FIG. 11 is a block diagram of an alternative embodiment of a host according to one or more examples of the present specification.

FIG. 11 is a block diagram of an alternative embodiment of a host 1100 according to one or more examples of the present specification. Host 1100 is substantially similar to host 500 of FIG. 5, including the presence of cores 1110, memory 1120, and local resources 1130. Host 1100 also includes a fabric interface 1172 including an overload protection engine 1174.

However, host 1100 is different in that additional post-processing options are provided by fabric interface 1172. For example, in the case that overload protection is enabled, and a packet is to be passed to cores 1110, the packet may first be processed by one or both additional functions, such as a load-balancing function 1180, or a weighted random early detection (W read) function.

In the case of load-balancing function 1180, traffic may be load balanced to one of a plurality of cores 1110 based on certain attributes of the packet. Traditionally, this load-balancing may be according to a designator such as an IP address, port, and/or protocol. The IP address may be either the source IP address or the destination IP address, depending on the context.

W read is a queuing function for a network scheduler that is configured to avoid congestion in overload situations. In W read, certain packets may be marked according to a waiting algorithm, and then provided to the core 1110. The receiving core 1110 may then receive the packet and determine whether to keep and continue processing the packet, or to drop the packet at the core. The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs.

Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a fabric interface, comprising: an ingress port to receive incoming network traffic; a host interface to forward the incoming network traffic to a host; and a virtualization-aware overload protection engine comprising: an overload detector to detect an overload condition on the incoming network traffic; a packet inspector to inspect packets of the incoming network traffic; and a prioritizer to identify low priority packets to be dropped, and high priority packets to be forwarded to the host.

Example 2 includes the fabric interface of example 1, further comprising a counter to count dropped low priority packets.

Example 3 includes the fabric interface of example 1, wherein the virtualization-aware overload protection engine is a hardware IP block.

Example 4 includes the fabric interface of example 1, wherein the prioritizer comprises an overload protection controller to apply hysteresis to the traffic to smooth overload handling.

Example 5 includes the fabric interface of example 1, wherein the prioritizer comprises a packet dispatcher to dispatch known high priority packets to the host.

Example 6 includes the fabric interface of example 1, wherein the prioritizer comprises a virtual network function (VNF) overload protector comprising a VNF policy table comprising logic for assigning a first class of packets as high priority based on a first VNF attribute, and a second class of packets as low priority based on a second VNF attribute.

Example 7 includes the fabric interface of example 1, wherein the prioritizer comprises a virtual interface overload protector comprising a virtual interface policy table comprising logic for assigning a first class of packets as high priority based on a first virtual interface attribute, and a second class of packets as low priority based on a second virtual interface attribute.

Example 8 includes the fabric interface of example 1, wherein the prioritizer comprises a protocol overload protector comprising a protocol policy table comprising logic for assigning a first class of packets as high priority based on a first protocol attribute, and a second class of packets as low priority based on a second protocol attribute.

Example 9 includes the fabric interface of example 1, wherein the prioritizer comprises a traffic class overload protector comprising a traffic class table comprising logic for assigning a first class of packets as high priority based on a first traffic class, and a second class of packets as low priority based on a second traffic class.

Example 10 includes the fabric interface of any of examples 1-8, further comprising a load balancer to load balance high priority packets to a plurality of cores on the host.

Example 11 includes the fabric interface of any of examples 1-8, further comprising a weighted random early detection (WRED) module to mark high priority packets for further inspection by the host.

Example 12 includes one or more tangible, non-transitory storage mediums having encoded thereon logic for providing a virtualization-aware overload protection engine operable to: receive incoming network traffic via an ingress interface; detect an overload condition on the incoming network traffic; inspect packets of the incoming network traffic; and prioritize the packets comprising identifying low priority packets to be dropped, and high priority packets to be forwarded to a host device via an egress interface.

Example 13 includes the one or more tangible, non-transitory storage mediums of example 12, wherein the virtualization-aware overload protection engine is further operable to count dropped low priority packets.

Example 14 includes the one or more tangible, non-transitory storage mediums of example 12, wherein the virtualization-aware overload protection engine is further operable to apply hysteresis to the traffic to smooth overload handling.

Example 15 includes the one or more tangible, non-transitory storage mediums of example 12, wherein the virtualization-aware overload protection engine is further operable to dispatch known high priority packets to the host.

Example 16 includes the one or more tangible, non-transitory storage mediums of example 12, wherein the virtualization-aware overload protection engine is further operable to provide virtual network function (VNF) overload protection comprising accessing a VNF policy table comprising logic for assigning a first class of packets as high priority based on a first VNF attribute, and a second class of packets as low priority based on a second VNF attribute.

Example 17 includes the one or more tangible, non-transitory storage mediums of example 12, wherein the virtualization-aware overload protection engine is further operable to provide virtual interface overload protection comprising accessing a virtual interface policy table comprising logic for assigning a first class of packets as high priority based on a first virtual interface attribute, and a second class of packets as low priority based on a second virtual interface attribute.

Example 18 includes the one or more tangible, non-transitory storage mediums of example 12, wherein the virtualization-aware overload protection engine is further operable to provide protocol overload protection comprising accessing a protocol policy table comprising logic for assigning a first class of packets as high priority based on a first protocol attribute, and a second class of packets as low priority based on a second protocol attribute.

Example 19 includes the one or more tangible, non-transitory storage mediums of example 12, wherein the virtualization-aware overload protection engine is further operable to provide traffic class overload protection comprising accessing a traffic class table comprising logic for assigning a first class of packets as high priority based on a first traffic class, and a second class of packets as low priority based on a second traffic class.

Example 20 includes the one or more tangible, non-transitory storage mediums of any of examples 12-20, wherein the virtualization-aware overload protection engine is further operable to provide load balancing to load balance high priority packets to a plurality of cores on the host.

Example 21 includes the one or more tangible, non-transitory storage mediums of any of examples 12-20, wherein the virtualization-aware overload protection engine is further operable to provide weighted random early detection (WRED) to mark high priority packets for further inspection by the host.

Example 22 includes a computing apparatus comprising: a host comprising a core; and a fabric interface, comprising: an ingress port to receive incoming network traffic; a host interface to forward the incoming network traffic to the host; and a virtualization-aware overload protection engine comprising: an overload detector to detect an overload condition on the incoming network traffic; a packet inspector to inspect packets of the incoming network traffic; and a prioritizer to identify low priority packets to be dropped, and high priority packets to be forwarded to the host.

Example 23 includes the computing apparatus of example 22, wherein the prioritizer comprises an overload protection controller to apply hysteresis to the traffic to smooth overload handling.

Example 24 includes the computing apparatus of example 22, wherein the prioritizer comprises a packet dispatcher to dispatch known high priority packets to the host.

Example 25 includes the computing apparatus of example 22, wherein the prioritizer comprises a decision tree, comprising: a virtual network function (VNF) overload protector comprising a VNF policy table comprising logic for assigning a first class of packets as high priority based on a first VNF attribute, and a second class of packets as low priority based on a second VNF attribute; a virtual interface overload protector comprising a virtual interface policy table comprising logic for assigning a first class of packets as high priority based on a first virtual interface attribute, and a second class of packets as low priority based on a second virtual interface attribute; a protocol overload protector comprising a protocol policy table comprising logic for assigning a first class of packets as high priority based on a first protocol attribute, and a second class of packets as low priority based on a second protocol attribute; and a traffic class overload protector comprising a traffic class table comprising logic for assigning a first class of packets as high priority based on a first traffic class, and a second class of packets as low priority based on a second traffic class.

Example 26 includes the computing apparatus of example 22, wherein the prioritizer comprises a virtual network function (VNF) overload protector comprising a VNF policy table comprising logic for assigning a first class of packets as high priority based on a first VNF attribute, and a second class of packets as low priority based on a second VNF attribute.

Example 27 includes the computing apparatus of example 22, wherein the prioritizer comprises a virtual interface overload protector comprising a virtual interface policy table comprising logic for assigning a first class of packets as high priority based on a first virtual interface attribute, and a second class of packets as low priority based on a second virtual interface attribute.

Example 28 includes the computing apparatus of example 22, wherein the prioritizer comprises a protocol overload protector comprising a protocol policy table comprising logic for assigning a first class of packets as high priority based on a first protocol attribute, and a second class of packets as low priority based on a second protocol attribute.

Example 29 includes the computing apparatus of example 22, wherein the prioritizer comprises a traffic class overload protector comprising a traffic class table comprising logic for assigning a first class of packets as high priority based on a first traffic class, and a second class of packets as low priority based on a second traffic class.

Example 30 includes the computing apparatus of any of examples 22-29, further comprising a load balancer to load balance high priority packets to a plurality of cores on the host.

Example 31 includes the computing apparatus of any of examples 22-29, further comprising a weighted random early detection (WRED) module to mark high priority packets for further inspection by the host.

Example 32 includes a method of providing overload protection, comprising: receiving incoming network traffic via an ingress interface; detecting an overload condition on the incoming network traffic; inspecting packets of the incoming network traffic; and prioritizing the packets comprising identifying low priority packets to be dropped, and high priority packets to be forwarded to a host device via an egress interface.

Example 33 includes the method of example 32, further comprising counting dropped low priority packets.

Example 34 includes the method of example 32, further comprising applying hysteresis to the traffic to smooth overload handling.

Example 35 includes the method of example 32, further comprising dispatching known high priority packets to the host.

Example 36 includes the method of example 32, further comprising providing virtual network function (VNF) overload protection comprising accessing a VNF policy table comprising logic for assigning a first class of packets as high priority based on a first VNF attribute, and a second class of packets as low priority based on a second VNF attribute.

Example 37 includes the method of example 32, further comprising providing virtual interface overload protection comprising accessing a virtual interface policy table comprising logic for assigning a first class of packets as high priority based on a first virtual interface attribute, and a second class of packets as low priority based on a second virtual interface attribute.

Example 38 includes the method of example 32, further comprising providing protocol overload protection comprising accessing a protocol policy table comprising logic for assigning a first class of packets as high priority based on a first protocol attribute, and a second class of packets as low priority based on a second protocol attribute.

Example 39 includes the method of example 32, further comprising providing traffic class overload protection comprising accessing a traffic class table comprising logic for assigning a first class of packets as high priority based on a first traffic class, and a second class of packets as low priority based on a second traffic class.

Example 40 includes the method of any of examples 32-39, further comprising providing load balancing to load balance high priority packets to a plurality of cores on the host.

Example 41 includes the method of any of examples 32-39, further comprising providing weighted random early detection (WRED) to mark high priority packets for further inspection by the host.

Example 42 includes an apparatus comprising means for performing the method of any of examples 32-41.

Example 43 includes the apparatus of example 42, wherein the means comprise a hardware IP block.

Example 44 includes the apparatus of example 42, wherein the means comprise a fabric interface.

Example 45 includes an apparatus comprising a host comprising a processor, and a fabric interface comprising means for performing the method of any of examples 32-41.

Example 46 includes a tangible, non-transitory medium having encoded thereon logic for providing the method of any of examples 32-41.

What is claimed is:

1. A fabric interface to communicatively couple a compute node to a network, comprising:
an ingress port to receive incoming network traffic;
a memory comprising a policy table;
a host interface to forward the incoming network traffic to a host via a local peripheral component interconnect express (PCIe) bus; and
circuitry within the fabric interface to, before the incoming network traffic reaches a central processor unit (CPU) of the compute node:
receive an incoming network packet via the ingress port, wherein the incoming network packet is directed to one of a plurality of virtual network functions (VNFs), and based on a query to the policy table and a queue depth of the one VNF, forward the incoming network packet to a node in a decision tree, forward the incoming network packet to a host, or drop the incoming network packet.

2. The fabric interface of claim 1, further comprising a counter to count dropped low priority packets.

3. The fabric interface of claim 1, wherein the circuitry includes a hardware intellectual property (IP) block.

4. The fabric interface of claim 1, further comprising an overload protection controller to apply hysteresis to the incoming network traffic to smooth overload handling.

5. The fabric interface of claim 1, further comprising a packet dispatcher to dispatch known high priority packets to the host.

6. The fabric interface of claim 1, further comprising a virtual network function (VNF) overload protector comprising a VNF policy table comprising logic for assigning a first class of packets as high priority based on a first VNF attribute, and a second class of packets as low priority based on a second VNF attribute.

7. The fabric interface of claim 1, further comprising a virtual interface overload protector comprising a virtual interface policy table comprising logic for assigning a first class of packets as high priority based on a first virtual interface attribute, and a second class of packets as low priority based on a second virtual interface attribute.

8. The fabric interface of claim 1, further comprising a protocol overload protector comprising a protocol policy table comprising logic for assigning a first class of packets as high priority based on a first protocol attribute, and a second class of packets as low priority based on a second protocol attribute.

9. The fabric interface of claim 1, further comprising a traffic class overload protector comprising a traffic class table comprising logic for assigning a first class of packets as high priority based on a first traffic class, and a second class of packets as low priority based on a second traffic class.

10. The fabric interface of claim 1, further comprising a load balancer to load balance high priority packets to a plurality of cores on the host.

11. The fabric interface of claim 1, further comprising a weighted random early detection (WRED) module to mark high priority packets for further inspection by the host.

12. One or more tangible, non-transitory storage mediums having encoded thereon instructions to:
receive an incoming network packet via an ingress interface, wherein the incoming network packet is directed to a virtual network function (VNF);
before the incoming network packet reaches a central processor unit (CPU) of a compute node detect, via a local peripheral component interconnect express (PCIe) bus, based on a query to a policy table and a queue depth of the VNF, forward the incoming network packet to a node in a decision tree, forward the incoming network packet to a host, or drop the incoming network packet.

13. The one or more tangible, non-transitory storage mediums of claim 12, wherein the instructions are further to count dropped low priority packets.

14. The one or more tangible, non-transitory storage mediums of claim 12, wherein the instructions are further to apply hysteresis to the incoming network traffic to smooth overload handling.

15. The one or more tangible, non-transitory storage mediums of claim 12, wherein the instructions are further to dispatch known high priority packets to a host device.

16. The one or more tangible, non-transitory storage mediums of claim 12, wherein the instructions are further to provide virtual network function (VNF) overload protection comprising accessing a VNF policy table comprising logic for assigning a first class of packets as high priority based on a first VNF attribute, and a second class of packets as low priority based on a second VNF attribute.

17. The one or more tangible, non-transitory storage mediums of claim 12, wherein the instructions are further to provide virtual interface overload protection comprising accessing a virtual interface policy table comprising logic for assigning a first class of packets as high priority based on a first virtual interface attribute, and a second class of packets as low priority based on a second virtual interface attribute.

18. The one or more tangible, non-transitory storage mediums of claim 12, wherein the instructions are further to provide protocol overload protection comprising accessing a protocol policy table comprising logic for assigning a first class of packets as high priority based on a first protocol attribute, and a second class of packets as low priority based on a second protocol attribute.

19. The one or more tangible, non-transitory storage mediums of claim 12, wherein the instructions are further to provide traffic class overload protection comprising accessing a traffic class table comprising logic for assigning a first class of packets as high priority based on a first traffic class, and a second class of packets as low priority based on a second traffic class.

20. The one or more tangible, non-transitory storage mediums of claim 12, wherein the instructions are further to provide load balancing to load balance high priority packets to a plurality of cores on a host device.

21. The one or more tangible, non-transitory storage mediums of claim 12, wherein the instructions are further to provide weighted random early detection (WRED) to mark high priority packets for further inspection by a host device.

22. A computing apparatus comprising:
a host comprising a core; and
a fabric interface circuit to communicatively couple a compute node to a network, comprising:
an ingress port to receive incoming network traffic;
a host interface to forward the incoming network traffic to the host via a local peripheral component interconnect express (PCIe) bus; and
circuitry to, before the incoming network traffic reaches a central processor unit (CPU) of the compute node:
receive an incoming network packet on the ingress port, wherein the incoming network packet is directed to one of a plurality of virtual network functions (VNFs), and based on a query to a policy table and a queue depth of the one VNF, forward the incoming network packet to a node in a decision tree, forward the incoming network packet to a host, or drop the incoming network packet.

23. The computing apparatus of claim 22, further comprising an overload protection controller to apply hysteresis to the incoming network traffic to smooth overload handling.

24. The computing apparatus of claim 22, further comprising a packet dispatcher to dispatch known high priority packets to the host.

25. The computing apparatus of claim 22, wherein the circuitry further comprises circuitry to provide decision tree, the decision tree to:
provision a VNF policy table to assign a first class of packets as high priority based on a first VNF attribute, and a second class of packets as low priority based on a second VNF attribute;
provision a virtual interface policy table and assign a first class of packets as high priority based on a first virtual interface attribute, and a second class of packets as low priority based on a second virtual interface attribute;
provision a protocol policy table and assign a first class of packets as high priority based on a first protocol attribute, and a second class of packets as low priority based on a second protocol attribute; and
provision a traffic class table and assign a first class of packets as high priority based on a first traffic class, and a second class of packets as low priority based on a second traffic class.

26. A network interface card (NIC), comprising circuitry to receive an incoming network packet on an ingress interface of the NIC, wherein the incoming network packet is directed to one of a plurality of virtual network functions (VNFs), and based on a query to a policy table and a queue depth of the one VNF, forward the incoming network packet to a node in a decision tree, forward the incoming network packet to a host, or drop the incoming network packet.

27. The NIC of claim 26, wherein the circuitry is further to compute a load of the one VNF.

28. The NIC of claim 26, wherein the circuitry is further to maintain a policy table for the plurality of VNFs.

29. The NIC of claim 26, wherein the queue depth of the one VNF is a reported queue depth.

* * * * *